United States Patent
Satzky et al.

(10) Patent No.: US 8,085,389 B2
(45) Date of Patent: Dec. 27, 2011

(54) OPTICAL SENSOR OPERATING ON THE TRANSIT TIME PRINCIPLE

(75) Inventors: Uwe Satzky, Hamburg (DE); Ernst Tabel, Hamburg (DE)

(73) Assignee: Pepperl + Fuchs GmbH, Mannheim (DE)

(*) Notice: Subject to any disclaimer, the term of this patent is extended or adjusted under 35 U.S.C. 154(b) by 131 days.

(21) Appl. No.: 12/731,626

(22) Filed: Mar. 25, 2010

(65) Prior Publication Data
US 2010/0245849 A1  Sep. 30, 2010

(30) Foreign Application Priority Data
Mar. 31, 2009  (EP) .................................. 09004764

(51) Int. Cl.
  *G01C 3/08*  (2006.01)
  *G01B 11/14*  (2006.01)
(52) U.S. Cl. ............ 356/5.01; 356/622; 356/141.5; 356/139.01
(58) Field of Classification Search ............ 356/5.01, 356/141.5, 139.01, 622; 250/578.1, 222.1, 250/215, 208.2
See application file for complete search history.

(56) References Cited

U.S. PATENT DOCUMENTS

| | | | |
|---|---|---|---|
| 4,319,332 A | | 3/1982 | Mehnert |
| 5,305,135 A | * | 4/1994 | Chovan ............ 359/202.1 |
| 5,570,222 A | * | 10/1996 | Chovan ............ 359/201.1 |
| 5,850,307 A | * | 12/1998 | Straayer .......... 359/209.1 |
| 7,068,167 B2 | * | 6/2006 | Brunner ........... 340/555 |
| 7,263,210 B2 | * | 8/2007 | Kummel ........... 382/110 |
| 7,402,743 B2 | * | 7/2008 | Clark et al. ....... 84/615 |
| 7,982,866 B2 | * | 7/2011 | Vogel ............... 356/141.5 |
| 2005/0279914 A1 | | 12/2005 | Dimsdale et al. |
| 2010/0245801 A1 | * | 9/2010 | Satzky et al. .... 356/5.01 |

FOREIGN PATENT DOCUMENTS

| | | |
|---|---|---|
| DE | 197 06 612 A1 | 8/1998 |
| DE | 197 32 776 C1 | 2/1999 |
| DE | 101 14 362 A1 | 10/2002 |
| DE | 10 2004 014 041 A1 | 10/2005 |
| EP | 1 378 763 A1 | 1/2004 |

OTHER PUBLICATIONS

Grubl, Alexander, "European Search Report", European Application No. EP 09 00 4764, Sep. 18, 2009, 2 pages.

* cited by examiner

*Primary Examiner* — Sang Nguyen
(74) *Attorney, Agent, or Firm* — John A. Merecki; Hoffman Warnick LLC

(57) ABSTRACT

The present invention relates to an optical sensor based on the transit time principle, comprising a light source for the emission of emergent light pulses into an observed region, comprising a rotating device for rotating a beam direction of the emergent light pulses about a rotation axis orientated transverse to the beam direction, and comprising a detector for the detection of light pulses reflected by objects in the observed region, comprising a housing for keeping the sensor interior separate from the environment and including a partitioning screen that is transparent to the emergent light pulses and to the reflected light pulses, comprising a test device for testing the translucence of the partitioning screen, and comprising a control and evaluation unit for controlling the light source, for evaluating the light pulses detected by the detector, and for determining the distance away of an object on the basis of the measured transit time of the light pulses, which control and evaluation unit cooperates with the test device.

17 Claims, 1 Drawing Sheet

OPTICAL SENSOR OPERATING ON THE TRANSIT TIME PRINCIPLE

FIELD OF THE INVENTION

The present invention relates to an optical sensor operating on the transit time principle.

RELATED ART

A generic optical sensor is described in EP 1 378 763 A1, for example, and it comprises the following components: a light source for emitting emergent light pulses into an observed region, a rotating device for rotating the path of the beam of emergent light pulses about a rotation axis oriented transversely to the direction of said beam, a detector for detecting light pulses reflected by objects in the observed region, a housing for keeping a sensor interior separate from the environment by means of a partitioning screen transparent to the emergent light pulses and to the reflected light pulses, with a test device for testing the translucence of the partitioning screen, and with a control and evaluation unit for controlling the light source, for evaluating the light pulses detected by the detector, and for determining the distance away of an object on the basis of the measured transit time of the light pulses, which control and evaluation unit cooperates with the test device.

Since the emergent light beam rotates and lasers are usually employed as light sources, such devices are also referred to as laser scanners, laser radars or two-dimensional laser measuring devices. Sensors of this type have hitherto been mainly used in industrial applications for a plurality of different tasks. A basic prerequisite for this purpose is a comparatively clean environment, since excessively high levels of pollution or dirt or weather conditions such as rain or snow render the sensor incapable of making measurements.

Generic devices are used for navigation of, for example, forklift trucks, said navigation being frequently carried out with the aid of reflectors mounted at defined locations in the environment. Navigation is basically also possible without reflectors, but here again, the respective conditions of the environment must be read into the evaluation unit in a teach-in phase.

Additional possible applications exist for tasks in the field of obstacle detection, safety of buildings, personal protection, volumetric measurement of objects, and thus basically for all problems relating in some way to the detection of object contours.

A basic task of optical sensors of this type is to ensure that the intensity of the emergent light pulses, usually provided by a laser, is sufficiently high to reach the objects it is desired to detect. If the laser beam is damped excessively or possibly fails altogether for some reason, this must necessarily be detected, since otherwise the sensor will signal "No object in the observed region" even though one or more objects may in fact be present in the observed region.

The functional efficiency of the laser itself can be monitored effectively. A major difficulty is encountered when the emergent light pulses have to pass through an optical window, such as the partitioning screen in this case, and this partitioning screen does not have the necessary properties and does not meet the requirements with respect to translucence. This can be the case when, for example, the partitioning screen is dirty or damaged or, in particular, flawed or cracked. In order to ensure proper functioning of the optical sensor, the translucence of the partitioning screen must be tested as thoroughly as possible. Such testing, also referred to as translucence monitoring, is absolutely necessary for reliable measuring, since the optical sensor will otherwise be unable to determine whether there is in fact no object present for detection or whether the light is fully absorbed by dirt on the partitioning screen with failure to detect any object actually present.

In the prior art, a curved partitioning screen is used, for example, through which test light is radiated by a light emitting diode such that it passes through the partitioning screen at two different areas thereof. This is carried out at several areas of the partitioning screen to effect as thorough a test of the partitioning screen as possible. Nevertheless, a total test, in particular one covering the full circular region of a 360° sensor, is not possible.

In the optical sensor described in EP 1 378 763 A1, an optical element such as a diffraction grating is mounted on an inside surface of the partitioning screen or front screen, and a portion of the emergent light pulses is caused by said optical element to pass to a detector disposed outside the housing. Dirt on the front screen or damage thereto can be determined with the aid of this device only at the location of said optical element. But here again, there is no possibility of carrying out a full test of the partitioning screen.

SUMMARY OF THE INVENTION

The present invention to provide an optical sensor of the type mentioned above with which a thorough examination of the partitioning screen is possible.

Embodiments of the optical sensor of the invention are described below, particularly with reference to the dependent claims and the FIGURE.

The optical sensor of the type mentioned above is developed, according to the invention, in that at least one test detector is provided in the sensor interior as part of the test device, which test detector is disposed on a rotor adapted to rotate about the rotation axis, in that the test detector is oriented toward throughput regions of the partitioning screen through which the emergent light pulses and/or the reflected light pulses pass, in that a test light source for providing the test light being likewise disposed on the rotor as an additional part of the test device, and in that at least one reflector element, to which the test light points, is disposed outside the housing, and in that the test detector is suitably positioned for detecting test light reflected by the reflector element.

According to the invention, a test detector is no longer positioned such that it is stationary, as in the prior art, but is instead mounted on a rotating rotor in the interior of the sensor.

The test detector in the interior of the sensor can then be oriented toward that region of the partitioning screen through which the emergent light pulses and/or the reflected light pulses pass.

For the purpose of providing the test light, a test light source is provided which is likewise mounted on the rotor. A comparatively simple translucence measurement can then be carried out with the aid of the test light supplied by the test light source.

According to the invention, at least one reflector element, toward which the test light points, is disposed outside the housing, and the test detector is positioned so as to detect the test light reflected by said reflector element.

It may be considered as being an advantage of the present invention that a continuous and, in particular, rotary control and monitoring of the throughput region of the partitioning screen is possible with the aid of the rotating test detector.

The partitioning screen can, in particular, have a surrounding form. That is to say, it extends over the full scanning range of 360°.

A particularly large area of the partitioning screen can be tested with respect to the translucence in a variant of the optical sensor of the invention in which the test light is emitted from the sensor interior outward through the partitioning screen in a first region, and the test light reflected by the reflector element passes back into the sensor interior through the partitioning screen in a second region, which second region is different from the first region. Both the properties of the first region of the partitioning screen and the properties of the second region of the partitioning screen are then included in the signal actually being measured by the test detector so that this measurement method is sensitive to both regions. The levels of the first and second regions can be offset in relation to each other, for example, so that the respective beams have different distances from the rotation axis, that is to say, the center of rotation. This can also be referred to as a centric offset.

These measures can significantly increase the operational reliability of the optical sensor of the invention.

In a simple variant, a circular annular mirror or segments thereof can be used as the reflector element.

The centric offset described above, that is to say, the variant in which the light which passes out through a different region of the partitioning screen from that through which the test light returns to the sensor interior, can be realized in a particularly inexpensive and elegant manner by the use of a reflector element which consists of, in particular, a circular annular profile of triangular cross-section, or segments thereof, made of a transparent plastics material. The test light beam is deflected by such a reflector profile, as in the case of a beam deflector known from the field of optics, by double internal reflection. The incident and the emergent beams are offset in relation to each other.

In order to achieve the best possible translucence of the partitioning screen, it is advantageous to provide means for broadening the beam emerging from the test light source. Since the test light source and the test detector both rotate, the beam does not need to be broadened or expanded in the direction of rotation, but only in a direction extending at right angles thereto. Therefore, the use of asymmetrical or cylindrical lenses can be advantageous for this purpose.

In order to distinguish portions of the test light reflected by the reflector element from portions of extraneous light, the test light source is preferably pulsed.

In principle, in order to achieve the most thorough examination of the translucence of the partitioning screen, a number of test light sources and/or a number of test detectors assigned thereto can also be provided in, say, diametrically opposed regions of the rotor.

In a further variant of the optical sensor of the invention, the reflector element is mounted below an overhang of the housing and is thus protected particularly effectively from mechanical damage and/or contamination by dirt.

Sensors of the type described above are known per se and they differ from each other mainly with respect to the operating range, scanning range, and the respective method used for processing the measured data. One particularly important difference is that the scanning range in the known devices is either approximately 180°, 270°, or 360°.

In the two-dimensional optical sensor of the type described in EP 1 378 763 A1, a rotating mirror is used in order to reflect the laser beam into a measurement plane. In this case, the laser radiates in the rotation axis and the receiver receives, in the same axis, the laser light reflected by an object. In the ideal case, the light is reflected by the mirror inclined at 45° through exactly a right angle toward the observed region, that is to say, the measurement plane, and from the observed region toward the receiver, respectively.

However, since these arrangements always show slight mechanical misalignments, referred to as residual optical errors, the angle of incidence of the laser light on the mirror is not the same for all rotary positions of the mirror. The rotating laser beam therefore gyrates about a plane extending at right angles to the rotation axis of the mirror. The beam is then said to exhibit a gyration error. The mounting of the mirror is, in general, the greatest handicap to solving this problem. If the mirror is mounted at the bottom of the mechanical assembly, it is still difficult to cause the laser light to radiate in the rotation axis toward the mirror. On the other hand, if the mirror is mounted and suspended at the top, problems arise concerning the mounting and arrangement of the drive system as a whole since this must generally be carried out using a boom-like assembly. In so doing, a blind spot occurs at the location of the boom-like system where the electrical supply line and the mechanical retaining means for the motor extend upwardly, and sensors of this design are not capable of all-round measurement, that is to say, they cannot scan the environment over the full range of 360°.

In an embodiment of the optical sensor of the invention, the light source, the detector, an electronic assembly forming part of the control and evaluation unit, and a mirror for deflecting the reflected light pulses to the detector are mounted for joint rotation on the rotor. It is thus possible, using simple technical means, to provide an optical sensor which operates on the transit time principle and with which a scanning range of 360° can be achieved.

A basic concept of this variant may be considered to be the fact that the light source and the detector are disposed in such a way that, unlike the prior art, they are in a fixed relationship to each other and can rotate together. Since the light source and the detector rotate concurrently in a fixed system, no gyration can occur. This constitutes a first important advantage of the invention.

Another advantage is that the hitherto existing difficulties with regard to the drive are no longer existent. Irrespective of where the rotor is driven, it does not disturb the measuring system in any way and the possibility of a blind spot is also eliminated, since no electrical or mechanical components need to be mounted above the measuring system.

Besides, a further improvement consists in that, since both the light source and the detector are positioned on the rotor, very compact superstructures can be achieved and, in particular, long optical paths can be obviated. The optical paths can be significantly shortened as compared with known systems comprising separately rotating mirrors and spatially fixed transmitters and receivers. In addition, much less overall installation space is required and the entire device can thus be produced with smaller dimensions.

As a result of the compact construction, air turbulence during rotation is additionally reduced and higher speeds of rotation are thus possible.

Basically, the light pulses reflected from the observed region can be guided and focused onto the detector with the aid of lenses. In a particularly preferred variant of the sensor of the invention, a mirror, likewise mounted on the rotor, is implemented as optical means for guiding the light pulses reflected by objects in the observed region to the detector.

On the one hand, this is made possible by the use of very lightweight components and, on the other hand, large numerical apertures and thus good light intensities can be achieved by means of a mirror while keeping down weight.

The mirror used is preferably a concave mirror, whereas particularly good focusing properties are available when a parabolic mirror is used. A lightweight component results in this case when the concave mirror is a molded plastic part provided with a coating.

In general, the optical sensor of the invention preferably has components that are formed so as to be as light in weight as possible and that are additionally positioned as close as possible to the rotation axis, that is to say, produce a minimum moment of inertia if possible. Higher speeds of rotation and thus higher scanning rates of the environment are then more readily obtainable.

Rotation frequencies of significantly more than 50 Hz, that is to say, speeds greater than 3000 rpm can be achieved with the use of the optical sensor described herein.

For the purpose of a rotative drive means, a permanent magnet is advantageously disposed on the rotor, which permanent magnet can be driven by coils disposed on a stator. The permanent magnet on the rotor acts in the manner of the rotor of an electric motor.

It is in principal possible to transfer electric energy via sliding contacts from the stator to the rotor. More preferably, however, the energy required for operating the light source, the detector, and the control and evaluation unit is transferred in a non-contact manner from the stator to the rotor. This can be realized particularly advantageously, in another variant of the optical sensor of the invention, by providing a transformer link between the stator and the rotor for transferring energy from the stator to the rotor. In principle, this transformer link can also be implemented for the transfer of information. For example, configuration data and/or control data can be transferred from the stationary part, i.e. the stator, to the moving part, i.e. the rotor, on which components of the control and evaluation unit are already present. Basically, low data rates are sufficient for this purpose.

In principle, the measurement data determined by the detector could also be transferred outwardly by electrical means. However, since large data volumes accumulate in so doing, it is particularly advantageous when an optical transmission path is formed between the rotor and the stator for transferring data from the rotor to the stator. Here, in principle, the transmission path can be one that enables a data transfer in one direction only, namely from the rotor to the stator. For this purpose, at least one suitable light source such as a light emitting diode is provided on the stator, the modulated signals from this light emitting diode are detected by one or more photodiodes suitably positioned on the stator. In principle, this optical transmission path can also be formed for bidirectional data exchange, in which case at least one light source and at least one photodetector must be provided at both ends of said path.

Such an optical transmission path can be realized on the rotation axis of the rotor in a particularly elegant and inexpensive manner.

A particularly compact construction and a very good paraxial arrangement of the different components is made possible, in an additional preferred embodiment of the invention, when the accommodating means, in which the light source, the detector, the test light source, the test detector, and/or the electronic assembly of the control and evaluation unit are held, are formed in the molded plastic part in which the mirror is formed.

BRIEF DESCRIPTION OF THE DRAWINGS

Additional advantages and features of the optical sensor of the invention are described below with reference to the accompanying FIGURE in which.

DETAILED DESCRIPTION OF THE INVENTION

Figure 1:
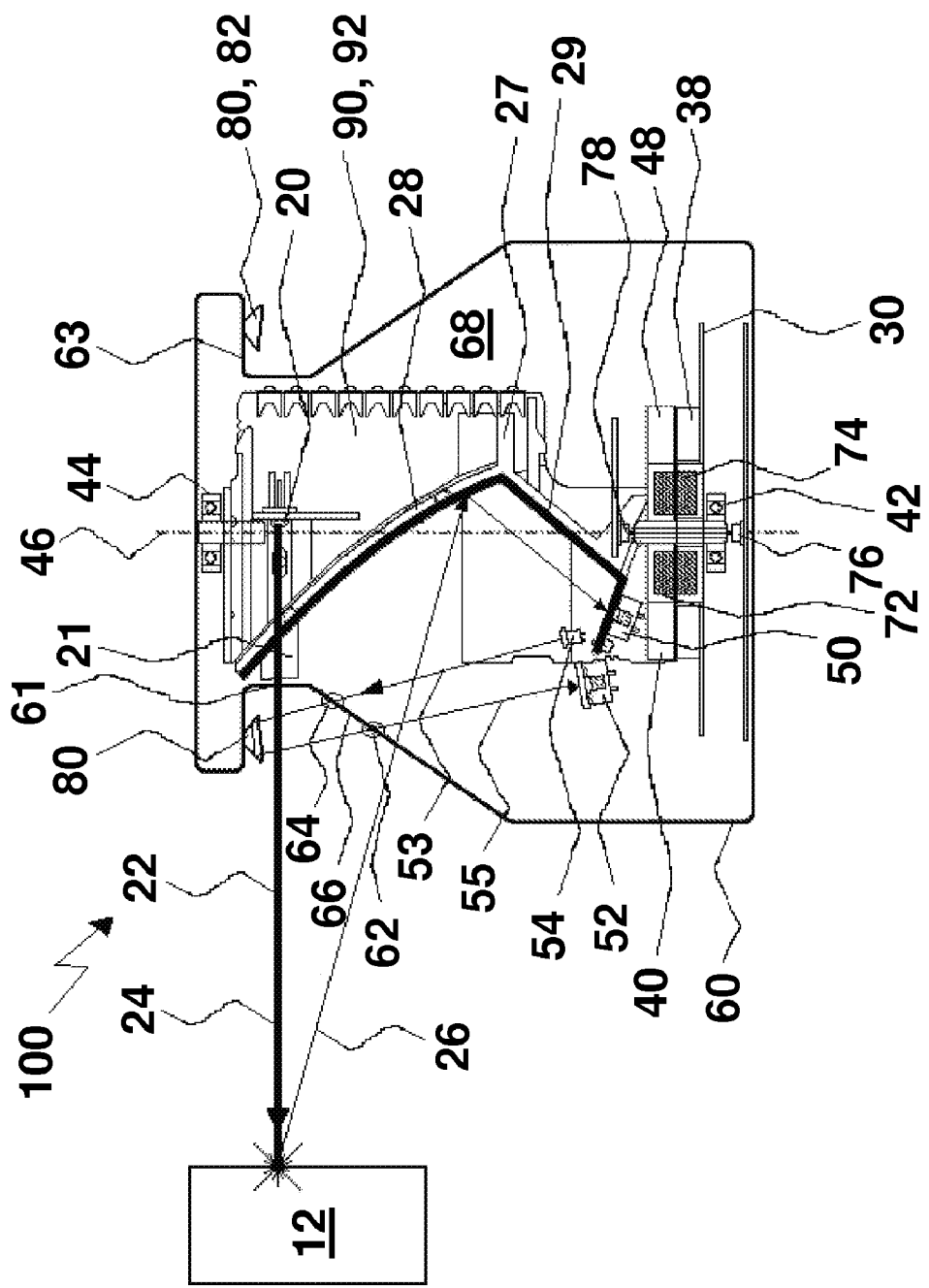
FIG. 1: shows an exemplary embodiment of an optical sensor of the invention.

An exemplary embodiment of an optical sensor 100 of the invention is described in detail with reference to FIG. 1. The components of the optical sensor 100 of the invention, shown diagrammatically in the drawing, are the following: a light source 20, a detector 50, and an electronic assembly 92 which is part of a control and evaluation unit 90. Furthermore, a concave mirror 28 is provided that is formed by a coating 29 on a molded plastic part 27. The light source 20, the detector 50, and the electronic assembly 92 are also accommodated in this molded plastic part 27 with the aid of suitable retaining means not shown in detail in FIG. 1.

The molded plastic part 27 with the components disposed thereon is mounted on a rotor 40 adapted for rotation in relation to a stator 30. The entire structure is accommodated in a housing 60 having a bottle-shaped profile, the rotor 40 being capable of rotating on ball bearings 42, 44 relatively to a rotation axis 46. To the rotor 40 there is also fixed a permanent magnet 48 which can be driven in the manner of an electric motor by means of coils 38 disposed on the stator 30. A transformer link is formed by coils 72, 74 in order to transfer energy from the stator 30 to the rotor 40. In principle, configuration data and/or control data can e.g. be transferred to the light source 20, the detector 50, and/or the electronic assembly 92 by way of this transformer link, albeit at a comparatively low data rate.

The housing 60, which may also be referred to as a hood, is used firstly for the purpose of keeping a sensor interior 68 separate from the environment and, in particular, of protecting the same from contamination and mechanical damage. An additional purpose of the housing 60 is to protect operators from the hazard posed by the rotor 40 rotating at high speed, for example at a speed of more than 3000 revolutions per minute.

An optical transmission path disposed axially, that is to say, along the rotation axis 46, is formed by a light emitting diode or laser diode 78 and a photodiode 76 for the transfer of data from the rotating part to the stator. The data rate across the optical transmission path from the rotor to the stator is, for example, 100 MBaud.

The housing 60 comprises a partitioning screen 66 that may also be referred to as a transparent region. The partitioning screen 66 need not be a separate component, but it can instead be formed as an integral part of the housing 60, as in the example illustrated. The housing 60 is transparent to the wavelengths used, at least in an outlet region 61, in which light pulses 22 from the light source 20 have to pass in an outward direction, and additionally in regions 62, 64, in which light pulses 26 reflected by an object 10 have to pass back into the sensor interior 68. In the example illustrated, a laser diode is used which emits at 660 nm, i.e. in the dark red range. In order to ensure that the partitioning screen 66 is sufficiently clean, that is to say, that it provides sufficient light translucence, a test light source 54, which is a light emitting diode in the example illustrated, and a test detector 52 are additionally mounted on the rotor 40. The test light source 54 and the test detector 52 can likewise be accommodated in retaining means formed in the molded plastic part 27. In principle, suitable optical means such as lenses can be provided for focusing the test light onto the test detector 52.

The test light source 54 is positioned such that emitted test light 53 passes through the partitioning screen 66 in a first region 64 and then impinges on a reflector element 80, by means of which it is reflected and radiated back toward the housing 60. The reflector element in the example illustrated is a circular annular profile 82 having a triangular cross-section and made of a transparent plastics material. As indicated diagrammatically in FIG. 1, the test light 53 is deflected by the reflector element 80 through 180° by double internal reflection, in which case the reflected test light 55 is slightly offset centrically outwardly, in accordance with the geometry of the reflector element 80. The reflected test light 55 re-enters into the sensor interior 68 in a second region 62 and then passes to the test detector 52, which is suitably positioned for this purpose so as to detect said test light 55. When the surfaces of the partitioning screen 66 are dirty or the partitioning screen 66 is damaged, for example cracked or flawed, this state is detected by the test detector 52 on account of the reduced intensity of the test light. The intensity of the test light 53, 55 measured by the test detector 52 is evaluated in the control and evaluation unit 90 and when the measured intensities are below a specified threshold value, the measurement data obtained are no longer taken into account in the evaluation.

An advantage of the optical sensor 100 described herein is that the front screen 66 can be monitored all around, also in principle, over the entire angular range of 360°, since the test source 54, like the test detector 52, is disposed on the rotor 40 and both rotate concurrently during operation of the sensor 100. The first region 64 and the second region 62 each therefore coincide with different areas on the front screen 66, depending on the angular position of the rotor 40. Another important advantage is that the first region 64 and the second region 62 do not coincide and thus a particularly large area of the partitioning screen 66 is covered by the evaluation concerning possible contamination by dirt.

A further advantage of the present invention is that the partitioning screen 66 need no longer be designed with a curved shape. Since the light source 20 can be positioned virtually very close to an outlet region 61 of the housing 60, virtually no inner reflections can result in said outlet region 61 from the emergent light pulses 22. The possibility of a back-glare is therefore obviated. In particular, the partitioning screen 66 can be designed with a simple cylindrical shape.

In order to prevent emergent light pulses 22 from impinging on the detector 50 in any other way than via reflection from an object 10, the light source 20 is countersunk in a tube 21 that is likewise molded on the molded plastic part 27.

A further detail of the optical sensor illustrated in FIG. 1 is that the circular annular profile 82 formed by the reflector element 80 is mounted below an overhang 63 of the housing 60 and is particularly effectively protected from mechanical impact and thus from extraneously caused damage.

In principle, in the translucence monitoring process described herein, a test light beam is transmitted obliquely from the base or from the upper plane of the rotor through the substantially cylindrical outer partitioning screen that is also referred to as the transparent region. This beam impinges on the upper or lower part of the reflection means such as the circular annular mirror or the circular annular profile and is reflected with a parallel offset. The partitioning screen is thus tested at two locations with respect to a possible contamination by dirt. This means that the distance data measured are evaluated as being valid only if both regions through which the test light passes are sufficiently clean.

The optical sensor of the invention operates as follows: The light source 20 basically operates like known laser pointers and emits, per second, e.g. 250,000 emergent light pulses 22 at a wavelength of 660 nm, that is to say, in the dark-red spectral range. With the aid of collimator optics, not shown in detail, the emergent light pulses 22 are collimated to form a parallel bundle of rays. In the example illustrated, the emergent light pulses 22 are emitted in a beam direction 24 oriented at right angles relative to the rotation axis 46 of the optical sensor 100. When the emergent light pulses 22 impinge on an object 10 in the observed region 12, they are reflected by this object 10 in the form of light pulses 26 which pass back through the front screen 66 back to the sensor interior 68 and onto the concave mirror 28 disposed therein. The detector 50 is positioned relative to the concave mirror 28 such that preferably all of the reflected light pulses 26 can be detected by the detector 50.

The control and evaluation unit 90, which is not shown in further detail in FIG. 1 and parts of which can also be disposed outside the housing 60, controls the light source 20, evaluates the light pulses 26 detected by the detector 50, and computes from the measured transit times a distance away of the detected object 10. By rotating the beam direction 24 of the emergent light pulses 22, the beam direction 24 is then moved in a plane and the optical sensor 100 of the invention can in this way record a profile of its environment.

Another advantage of the variant of the optical sensor of the invention described herein is that compact and, in particular, paraxial arrangements can be set up as a result of the light source, mirror, detector, and evaluation electronics being jointly disposed on the rotor. Air turbulence, which constitutes a limiting factor on the maximum rotation speeds achievable, can be reduced significantly by this unit consisting of the transmitter, mirror, receiver, and electronic assembly.

Higher rotation speeds are thus made possible, so that the respective environment can be detected at a greater scanning rate in navigation applications. This is particularly important for applications in which the devices or vehicles to be navigated or controlled move comparatively rapidly. If here the measured data coming from the environment were supplied only at a low rate, the position of the vehicle to be navigated would already significantly change between two measurements. The resulting effects are also referred to as spatial distortions. Theoretically, the latter can be back computed but this would necessitate additional sensors such as velocity sensors or angle-measuring sensors in the manner of a compass.

When use is made of the optical sensor of the invention, there is no need for these additional sensors in a number of applications on account of the increased speed of rotation and as a result of which considerable cost saving is possible.

A further possible application for the sensors of the invention is toll calculation in the field of traffic monitoring. An optical sensor of the invention could be mounted, for example, on a bridge to determine the profiles or contours of the vehicles traveling under the bridge. Since these profiles for the different vehicle types are in most cases very distinctive, thus it is possible to determine the point in time at which a certain vehicle type passed under the bridge in question.

The present invention describes a novel two-dimensional optical measuring sensor operating on the transit time principle and in which a continuous and, in particular, rotary control and monitoring of the transmission through a throughput region in the partitioning screen can be realized in a particularly elegant manner. This is made possible by means of a rotating test device comprising a test detector and a test light source. An additional feature of the optical sensor described herein is that no independently rotating mirror is provided, the retaining means for which would create a blind spot. In the optical sensor described herein, there is rotation of the complete measuring unit, that is to say, a unit including the light source, the detector, the mirror, and parts of the electronic measuring equipment. This makes it possible to monitor the entire range of rotation through 360° by simple means. The energy required for the light source, the detector and the electronic equipment is transferred in a non-contacting manner from the stator to the rotor, which is also referred to as a measuring head. Likewise, the data is transferred from the rotor to the stationary part of the sensor, also referred to as the stator, in a non-contacting manner, in particular by way of an optical transmission route.

The invention claimed is:

1. An optical sensor based on a transit time principle, comprising:
   a light source for emitting emergent light pulses into an observed region;
   a rotating device for rotating a beam direction of the emergent light pulses about a rotation axis orientated vertically to the beam direction;
   a detector for detecting light pulses reflected by objects in the observed region;
   a housing for separating an interior of the sensor from the environment and including a partitioning screen that is transparent to the emergent light pulses and to the reflected light pulses;
   a test device for testing a translucence of the partitioning screen; and
   a control and evaluation unit, cooperating with the test device, for controlling the light source, for evaluating the light pulses detected by the detector, and for determining a distance of an object using a measured transit time of the light pulses;
   wherein
   at least one test detector, mounted on a rotor adapted to rotate about the rotation axis, is provided in the interior of the sensor to form part of the test device;
   the test detector is oriented toward throughput regions of the partitioning screen through which at least one of the emergent light pulses and the reflected light pulses pass;
   a test light source, mounted on the rotor and forming part of the test device, supplies the emergent light pulses;
   at least one reflector element to which the test light is directed is arranged outside the housing; and
   the test detector is positioned such that it can detect the test light reflected by the reflector element.

2. The sensor as defined in claim 1,
   wherein
   the test light passes from the interior of the sensor outwardly through the partitioning screen in a first region thereof; and
   the test light reflected by the reflector element passes from outside inwardly to the interior of the sensor through the partitioning screen in a second region which differs from the first region.

3. The sensor as defined in claim 1,
   wherein
   the test light source is adapted for pulsed operation.

4. The sensor as defined in claim 1,
   wherein
   the reflector element is a circular annular mirror.

5. The sensor as defined in claim 1,
   wherein
   the reflector element is a circular annular profile having a triangular cross-section.

6. The sensor as defined in claim 5,
   wherein
   the reflector element comprises a transparent plastics material.

7. The sensor as defined in claim 1,
   wherein
   the reflector element is mounted below an overhang of the housing.

8. The sensor as defined in claim 1,
   wherein
   a component for broadening a beam emitted by the test light source is provided.

9. The sensor as defined claim 1,
   wherein
   the light source, the detector, an electronic assembly, forming part of the control and evaluation unit, and a mirror for guiding the reflected light pulses to the detector, are arranged for joint rotation on the rotor.

10. The sensor as defined in claim 9,
    wherein
    the mirror comprises a concave mirror or a parabolic mirror.

11. The sensor as defined in claim 9,
    wherein
    the mirror comprises a molded plastic part provided with a coating.

12. The sensor as defined in claim 11,
    wherein
    the molded plastic part accommodates at least one of the light source, the detector, the test light source, the test detector, and the electronic assembly.

13. The sensor as defined in claim 1,
    wherein
    on the rotor is arranged a permanent magnet capable of being driven by coils located on a stator.

14. The sensor as defined in claim 13,
    wherein
    between the stator and the rotor is provided a transformer link for a transfer of energy from the stator to the rotor.

15. The sensor as defined in claim 13,
    wherein
    for transfer of data from the rotor to the stator there is provided an optical transmission route between the rotor and the stator along the rotation axis.

16. The sensor as defined in claim 1,
    wherein
    at least one of a plurality of test detectors and a plurality of assigned test light sources are provided.

17. The sensor as defined in claim 1,
    wherein
    at least one of a plurality of test detectors and a plurality of assigned test light sources are provided at opposed sites of the rotor.

* * * * *